United States Patent [19]

Sinko

[11] Patent Number: 5,558,706
[45] Date of Patent: Sep. 24, 1996

[54] CORROSION INHIBITING PIGMENT COMPOSITION

[75] Inventor: John Sinko, Glendale, Wis.

[73] Assignee: Wayne Pigment Corp., Milwaukee, Wis.

[21] Appl. No.: 754,448

[22] Filed: Dec. 15, 1995

Related U.S. Application Data

[63] Continuation-in-part of Ser. No. 155,586, Nov. 19, 1993, Pat. No. 5,487,779.

[51] Int. Cl.$^6$ .................................................. C04B 14/36
[52] U.S. Cl. .................. 106/480; 106/14.05; 106/14.24; 106/14.41; 106/14.42; 106/14.44; 106/253; 106/254; 106/256; 106/263; 106/419; 106/425; 106/429; 106/432; 106/493; 423/143; 423/147; 423/368; 423/369; 423/378; 524/195
[58] Field of Search ............................ 106/14.05, 14.41, 106/14.42, 14.44, 419, 425, 429, 480, 253, 254, 256, 263, 432, 493, 14.24; 423/368, 369, 378, 143, 147; 524/195

[56] References Cited

U.S. PATENT DOCUMENTS

| | | | |
|---|---|---|---|
| 3,457,138 | 7/1969 | Miller | 428/34 |
| 4,508,767 | 4/1985 | Hokamura et al. | 427/407.1 |
| 4,513,061 | 4/1985 | Kawakubo et al. | 428/429 |
| 4,533,525 | 8/1985 | Minamide et al. | 428/469 |
| 4,625,061 | 11/1986 | van Hardeveld et al. | 564/103 |
| 4,707,405 | 11/1987 | Evans et al. | 428/336 |
| 5,009,935 | 4/1991 | Waddington et al. | 428/457 |
| 5,075,134 | 12/1991 | Sanford | 427/165 |
| 5,094,881 | 3/1992 | Sanford et al. | 427/162 |
| 5,143,789 | 9/1992 | Sanford et al. | 428/432 |
| 5,176,894 | 1/1993 | Sinko | 423/368 |
| 5,314,532 | 3/1994 | Hughes et al. | 106/14.24 |
| 5,378,446 | 1/1995 | Sinko | 423/368 |

FOREIGN PATENT DOCUMENTS 29-8020 12/1954 Japan.
905959 9/1962 United Kingdom.

OTHER PUBLICATIONS

"Chimie Mineral—Sur des cyanamides de nickel et de cobalt", Maurice A. Bernard and Annie Chemin, Jan. 17, 1966.
Advanced Inorganic Chemistry, Cotton, F. A. et al., Interscience, 1966, pp. 605,865.
Chem. Abs. 69:100291 of "Thermochemical Study of some metal cyanamides. I. Enthalpies of formation." in Bull. Soc. Chim. Fr. (1968), (6), 2357, Bernard, M..
Chem. Abs. 69:99876, ". . . II. Thermochemical study of hydrolysis kinetics for cyanamide in aqueous media." Bull. Soc. Chim. Fr. (1968), (6), 2359–61, Bernard, M..

Primary Examiner—Mark L. Bell
Assistant Examiner—Scott L. Hertzog
Attorney, Agent, or Firm—Ryan, Maki, Mann & Hohenfeldt

[57] ABSTRACT

A corrosion inhibitor pigment composition is based a solid solution of $(Ni^{2+}+Co^{2+})$-bis-hydrogen cyanamide.

5 Claims, 2 Drawing Sheets

CORROSION INHIBITING PIGMENT COMPOSITION

This is a continuation-in-part of application Ser. No. 08/155,586 filed on Nov. 19, 1993, now U.S. Pat. No. 5,487,779.

FIELD OF THE INVENTION

This invention relates to corrosion inhibiting pigment compositions. More particularly, it relates to such compositions having particular applicability to mirror backing formulations which are based on solid solutions of salt derivatives of hydrogen cyanamide formed with certain transition metals such as nickel and cobalt.

BACKGROUND OF THE INVENTION

Silver layers on mirrors are extremely sensitive to the presence and corrosive action of airborne contaminants, e.g., salt particles typical in coastal regions, or $H_2S$, $NH_3$ or acidic contaminants which are always present in domestic or urban environments. These contaminants, in the presence of moisture, are able to promote oxidative processes which occur according to the reaction $Ag-e \rightarrow Ag^+$ and result in the corrosive disintegration of the mirror's reflective layer. Specialized corrosion preventive coating systems, known as "mirror backing" coatings are applied in order to extend a silver mirror's service life.

It is known that non-pigmented protective coatings formulated without a corrosion inhibitor pigment component, exhibit limited anti-corrosion protection and consequently do not provide long term service life. Therefore, corrosion inhibitor pigments are critically important functional components of mirror coating systems and basically determine the useful service life of the protected silver surface.

It is known in the prior art to use various lead salts, such as lead cyanamide as corrosion retardant pigment components of mirror backing formulations. The specific corrosion retardant activity displayed by these compounds on Ag surfaces is attributed to the presence of lead species and perhaps to their $S^{2-}$ scavenging capacity. Due to the excellent performance of mirror backing formulations containing lead compounds, such systems have been widely used for decades by the mirror manufacturing industry. Efforts to develop lead-free alternatives having anticorrosive activity for silver have been spurred by environmental concerns.

U.S. Pat. No. 4,707,405/1987 (Evans et al.) discloses the use of metal derivatives of hydrogen cyanamide other than lead cyanamide as corrosion retardant pigment components in mirror backing protective coatings. However that patent limits the concept exclusively to cyanamides formed by Group IIA and IIB elements such as magnesium, calcium and zinc.

There are several chemical and physical properties which a pigment grade product must possess in order to function as a component of a paint formulation and/or mirror backing protective coating. Among the required characteristics are limited water solubility, moderate alkalinity and compatibility with resins and solvents used in such formulations. Specifically the capacity to interact with, and provide inhibitive activity against substrate specific electro-chemical oxidant processes, which promote corrosive decomposition of Ag surfaces, are the most important, and are determined by the pigment's chemical composition and structure. In this sense the disclosures of the above identified U.S. Patent leave a need for further improved pigment systems for use in mirror backing formulations.

Zinc cyanamide is known for its valuable pigmentary proprieties and its applicability as anticorrosive pigment in primer formulations recommended, i.e., for steel surface protection. In my U.S. Pat. No. 5,176,894 issued Jan. 5, 1993, I disclosed a pigment grade zinc cyanamide which meets the quality requirements for a mirror back protective coating, i.e., high assay and absence of soluble salts.

It is well known in the chemical literature that hydrogen cyanamide, a di-basic acid, forms neutral, as well as basic and acidic salt derivatives with numerous metals, inclusive of the Group IA, IIA elements and some metals of the first, second and third transition series, among others with $Co^{2+}$ and $Ni^{2+}$.

It is important to note, however, that $Ni^{2+}$ and $Co^{2+}$ are the only species known to form the bis-hydrogen cyanamide structures symbolized by $Me(HNCN)_2$ ($Me^{2+}=Ni^{2+}$, $Co^{2+}$) where the Me/NCN stoichiometrical ratio is 1:2.

Considering that the $=N-C\equiv N$ moiety of any cyanamide compound, due to its characteristic structure, is likely to generate the electrochemically active inhibitor species (by interacting with moisture in situ in the protective coating) accountable for substrate specific corrosion preventive activity on silver, it becomes evident that such derivatives characterized by "bis" structure should be preferably employed as inhibitor pigments. In support of this observation it will be noted that the theoretical value in weight % of the "NCN" content for ZnNCN is only 37.9 compared to 58.1 for Ni or Co bis-hydrogen cyanamide.

Bernard, et al., [Compt. Rend. Ser. C 262(3), 282–4 (1966) report that $Ni^{2+}$ and $Co^{2+}$ species form cyanamide derivatives of bis-hydrogen cyanamide structure and disclose a relevant preparation procedure based on the precipitation reaction involving hexamine-nickelate or cobaltate species and $H_2NCN$ in ammoniacal medium, as follows:

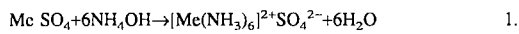

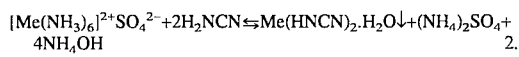

where $Me=Co^{2+}$ or $Ni^{2+}$

Typically the procedure is carried out by introducing $H_2NCN$ into ammoniacal solution of hexamine-nickelate or —cobaltate and by subsequent agitation of the system for 18 hours at pH=7.5. A similar procedure is disclosed, specified exclusively for $Ni^{2+}$ cyanamide in Example 4 of Japanese Patent Nr. SHO 29-8020/12.07.54. The process is performed in one hour by simultaneously introducing nickel sulfate solution and ammonia gas into hydrogen cyanamide solution, at 25°–30° C. and by keeping the pH of the system at 7.5 to 8.5.

The $NiSO_4/H_2NCN=1:1$ molar ratio, recommended, quite surprisingly, by this Japanese patent, fails to consider the bis-hydrogen cyanamide structure of the intended product and represents a basic stoichiometrical error (See reaction 2.), which results in particularly low yield (of about 53% in $Ni(HNCN)_2.H_2O$) based on the disclosed value, and the correspondingly high amount (practically 50%) of unconverted $NiSO_4$ dissolved and lost in the process water.

As expected, the disclosed value of the obtained product's nitrogen content (33.2% N) is consistent with bis-hydrogen cyanamide composition, however of a relatively poor quality, which is a direct consequence, as well, of the employed inadequate $NiSO_4/H_2NCN$ molar ratio. For the same reason under the final conditions of the process (absence of $H_2NCN$, high $Ni^{2+}$ concentration, pH~8.0) basic divalent nickel salts also precipitate which, by subsequent dehydration are converted into dark colored, inactive inclusions in the final products.

In addition to the above-exemplified shortcomings, there are inherent limitations of the manufacturing procedures known by the prior art, all specifically related to the precipitation reaction involving hexamine-nickelate or —cobaltate and $H_2NCN$, respectively to the employment of ammonia as pH control reagent. Beside the inconvenience caused by the volatility of $NH_3$ at the recommended pH value, which require the employment of protective technologies, the following limitations are observed:

1. Reaction 2, a typical process of precipitation involving dissolved hexamine nickelate or cobaltate species, reaches an equilibrium which obstructs the completion of the direct reaction (basically the formation of the product by precipitation) to the desirable extent, even at substantial stoichiometrical excesses of $H_2NCN$. This undesirable characteristic of the reaction system is a direct consequence of the presence of ammonium salts, soluble by-products formed according to reaction 2, capable to prevent the complete precipitation of $Ni^{2+}$ or $Co^{2+}$ species as cyanamides. Thus the yield of the process is substantially reduced and the resulting process water (mother liquor and wash water) contains large amounts of irrecuperable $Ni^{2+}$ species as well as undesirable ammonium salts.

2. As the complete removal of the soluble by-products (usually accomplished by extensive washing) is the critical phase of any corrosion retardant pigment manufacturing process which essentially determines the quality of the final product, processes that use ammonia for pH control, for aforementioned reasons, result in large amounts of non-recyclable, environmentally hazardous process water with high $Ni^{2+}$ or $Co^{2+}$ contents.

SUMMARY OF THE INVENTION

Consistent with the above disclosed considerations, it is a principal object of the present invention to provide inhibitor pigment grade products and coprecipitated pigment compositions characterized by bis-hydrogen cyanamide structures, or containing such products, and procedures to manufacture the same. The pigment compositions produced according to the subsequently disclosed procedures provide corrosion inhibitive activity, specifically on silver substrates, and are suitable to be employed in "mirror backing" paint and coating formulations.

Coprecipitated pigment compositions comprising solid solutions of $Ni^{2+}+Co^{2+}$ bis-hydrogen cyanamides and various transition metal cyanamides; i.e., $Pb^{2+}$, $Cd^{2+}$, $Cu^{2+}$, $Ag^+$, etc. can be obtained according to the subsequently disclosed procedures. However, without any intent to limit the applicability of the present invention, the relevant Examples are limited to $Co^{2+}$, $Ni^{2+}$, and $Zn^{2+}$ coprecipitated cyanamides.

As subsequently disclosed, solid solutions of $Ni^{2+}+Co^{2+}$ bis-hydrogen cyanamide, or compositions comprising such derivatives coprecipitated with transition metal cyanamides, more specifically zinc cyanamide, are produced at pigment grade quality (high assay, soluble salt contaminant-free conditions) according to an environmentally compatible procedure which results in heavy metal-free waste waters.

It was observed pursuant to the present invention that Co-bis-hydrogen cyanamide and Ni-bis-hydrogen cyanamide, if produced by coprecipitation as disclosed hereinafter, in any weight ratios, form solid solutions of (cobalt and nickel)-bis-hydrogen cyanamides. In contrast, with solid physical mixtures or blends which consist of distinct, identifiable phase components which are separable by mechanical procedures, solid solutions display monophasic behavior in that all constituents are uniformly dispersed at an ionic or molecular level, and consequently such systems behave as distinct chemical entities.

Briefly summarized, the invention provides pigment grade solid solutions of $Ni^{2+}+CO^{2+}$ bis-hydrogen cyanamide derivatives with enhanced corrosion inhibitive activity on silver. The solid solutions are formed by coprecipitating, in situ, mixtures of $Ni(OH)_2$ and $Co(OH)_2$, and reacting the same with a stoichiometrical excess of $H_2NCN$.

Coprecipitated pigment compositions containing bis-hydrogen cyanamide derivatives and zinc cyanamide are also produced by introducing dispersed and hydrated ZnO into the reaction system and reacting it with $H_2NCN$ at appropriate stoichiometrical ratios.

BRIEF DESCRIPTION OF DRAWINGS

IR spectra characterizing $Ni^{2+}$ and $Co^{2+}$ bis-hydrogen cyanamides and solid solutions of ($Co^{2+}/Ni^{2+}$) bis-hydrogen cyanamides are shown in FIG. 1, and, IR spectra of coprecipitated pigment compositions based on ZnNCN and the aforementioned bis-hydrogen cyanamide derivatives in 10/1 molar ratio, are presented in FIG. 2.

DETAILED DESCRIPTION OF THE PREFERRED EMBODIMENTS

Figure 1:
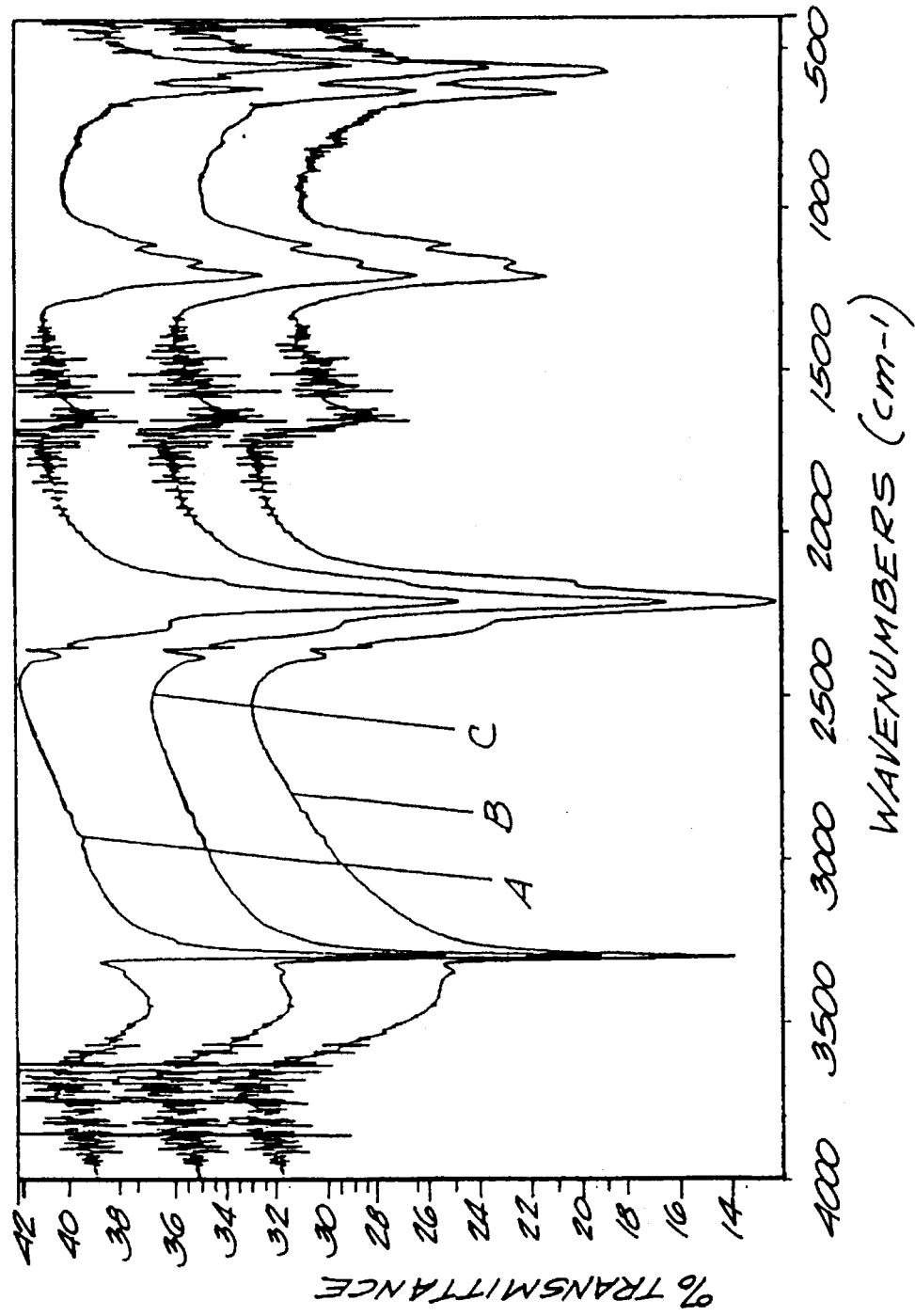

The above presented limitations, which are characteristic to the manufacturing procedures known by the prior art, are eliminated according to the present invention by producing high quality pigment grade $Ni^{2+}$ and $Co^{2+}$ bis-hydrogen cyanamides and solid solutions of $Ni^{2+}+Co^{2+}$ bis-hydrogen cyanamides based on the heterogeneous reaction involving insoluble and freshly coprecipitated $Ni(OH)_2$ and $Co(OH)_2$ and $H_2NCN$, as follows:

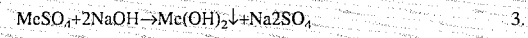

$$MeSO_4 + 2NaOH \rightarrow Me(OH)_2\downarrow + Na_2SO_4 \qquad 3.$$

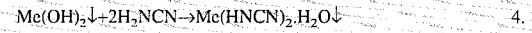

$$Me(OH)_2\downarrow + 2H_2NCN \rightarrow Me(HNCN)_2 \cdot H_2O\downarrow \qquad 4.$$

where Me=$Ni^{2+}$ or $Co^{2+}$

Such pigment grade quality solid solutions of $Ni^{2+}+Co^{2+}$ bis-hydrogen cyanamides typically are characterized by high N (or cyanamide) content, virtual absence of insoluble contaminants and light green or light brown color, respectively.

Both, $Ni^{2+}$ and $Co^{2+}$ species are characterized by similar chemical behavior under the conditions of reaction 3 and 4; both $Co(OH)_2$ and $Ni(OH)_2$ are insoluble in excess of NaOH or in the presence of soluble by-products of reaction 3, and if freshly precipitated, react instantaneously and quantitatively with $H_2NCN$.

As above indicated, in contrast to reaction 2, reaction 4 is a diffusionally controlled heterogeneous process which takes place at the $Me(OH)_2$ liquid interface and converts the freshly precipitated solid precursor into the solid final product. It is observed that the reaction plausibly occurs by nucleophile substitution, where the $^{(-)}HNCN$ anion is actually the reactive species, formed by dissociation favored in alkaline medium, as follows:

$$H_2NCN + OH^- \rightleftharpoons HNCN^- + H_2O \qquad 5.$$

As a consequence of the above presented considerations, the rate of reaction 4 is determined by the magnitude of the specific surface area of the hydroxide phase, the $^{(-)}$HNCN concentration and, most importantly, the alkalinity of the medium. It will be observed, however, that the effect of the medium's alkalinity on the reaction rate is a complex one; it does favorably regulate the concentration of the $^{(-)}$HNCN anion but also promotes the well known dimerization of $H_2NCN$, in this case an undesirable process, competitive with reaction 4.

Under the conditions determined by reaction 4, processes could occur, as well, which are undesirable in reference to the object of the present invention and adversely affect the final products' quality.

In this respect, it will be observed that under mild basic conditions, $Co^{2+}$ species specifically tend to turn into insoluble basic salts of $Co(OH)x$ type (where $x=NO_3-$, $SO_42-$), which although are readily convertible into $Co(OH)_2$ with appropriate excess of NaOH, do not themselves react according to reaction 4.

Equally undesirable is the tendency of freshly precipitated $Co(OH)_2$ to undergo slow oxidation on exposure to air, yielding dark colored and non-reactive $Co(OH)_3$, according to the following reaction:

$$4Co(OH)_2+O_2+2H_2O \rightarrow 4Co(OH)_3 \downarrow \qquad 6.$$

Such coprecipitated non-reactive species are converted by dehydration into darkly colored oxides, which, as inclusion contaminants, degrade the typically light color and reduce the cyanamide content of the final products.

The incomplete conversion according to reaction 4 of the $Co(OH)_2$ or $Ni(OH)_2$ reactive precursor species, due to less than optimal $^-$HNCN concentration in the reaction medium, as well, adversely affects the final product's quality.

The occurrence of these undesirable side reactions are prevented according to the present invention by selecting appropriate process parameters, as subsequently disclosed.

In this respect, it is observed, that reactions 3 and 4 according to the present invention are preferable carried out by instantaneously reacting $Ni(OH)_2$ and/or $Co(OH)_2$, freshly precipitated in situ in the reaction medium, with an appropriate excess of $H_2NCN$.

During precipitation, which is performed in 15 to 30 minutes, the alkalinity and temperature of the reaction medium is kept at pH=8 to 9.0, preferably 8.5, and 15°–25° C., respectively.

The above specified optimal reaction conditions are maintained by simultaneous and individual introduction of the raw materials, at appropriate rates, into the reaction medium. The method of this invention also includes the further steps of filtering the reaction product, washing the filtered product with water to a substantially salt-free condition and subsequently drying the product.

It was observed pursuant to the present invention that Co-bis-hydrogen cyanamide and Ni-bis-hydrogen cyanamide, if produced by coprecipitation as disclosed hereinafter, in any weight ratios, form solid solutions of cobalt/nickel -bis-hydrogen cyanamides. These solid solutions display monophasic behavior by containing all constituents uniformly dispersed at an ionic/molecular level. Such systems, thus, can be regarded as distinct chemical entities.

Formally, the chemical composition and structure of solid solutions formed by Co- and Ni-bis-hydrogen cyanamides, are represented by

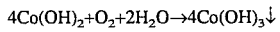

$(yCo+zNi)(HNCN)_2$, where $y+z=1$ and $0<y, z<1$

In support of this statement the IR spectra of $Co(HNCN)_2$, $Ni(HNCN)_2$ and $(yCo+zNi)(HNCN)_2$, where $y=z$, are presented. (See FIG. 1.) As it can be seen, all the above cited spectra are identical in all details (see band at 3292 cm$^{-1}$) and more specifically so in respect of the fine structure or relative intensities displayed by the component bands of the 2000–2300 cm$^{-1}$, 1100–1200 cm$^{-1}$ and 560–620 cm$^{-1}$ characteristic absorption bands.

The existence of solid solutions of $(yCo+zNi)(HNCN)_2$, where $z+y=1$ and $0<y, z<1$; related synthesis procedures and the above disclosed identity of pertinent IR spectra are facts observed pursuant to the present invention and unknown in the prior art.

Considering the state of knowledge regarding the chemistry of various metal derivatives of cyanamides, the above specified experimental facts are unexpected, as well. In that sense is important to observe that cyanamide derivatives of different metals are generally not known by the art to form solid solutions.

As for the identity (equivalency) of IR spectra of Co—Ni—, and solid solutions of (Co+Ni)-bis-hydrogen cyanamides, as above disclosed, it does constitute an anomaly, for metal-cyanamides characteristic absorption band's exact position (generally situated at 3200–3500, 2000 to 2200 and 560–680 cm$^{-1}$) and fine structure are dependent on the metal cations' chemical identity. See the details regarding the IR spectrum of ZnNCN in my U.S. Pat. No. 5,378,446, as well as in FIG. 2.

Synthesis procedures and analytical data are presented subsequently, pertinent to the following:

$Co(HNCN)_2$ and $Ni(HNCN)_2$;

Physical mixtures of $ZnNCN+Co(HNCN)_2$ and $ZnNCN+Ni(HNCN)_2$;

Solid solutions of $(yCo+zNi)(HNCN)_2$ where $y=z$;

Physical mixtures of ZnNCN and solid solutions of $(yCo+zNi)(HNCN)_2$, where $y=z$;]

It will be noted, that for reasons of simplicity and with no intention to limit the applicability of the present invention, the data disclosed below are given exclusively in reference to $(yCo+zNi)(HNCN)_2$, where $y=z$, which is only one of numerous solid solutions possible in the $Co(HNCN)_2/Ni(HNCN)_2$ system.

Figure 2:
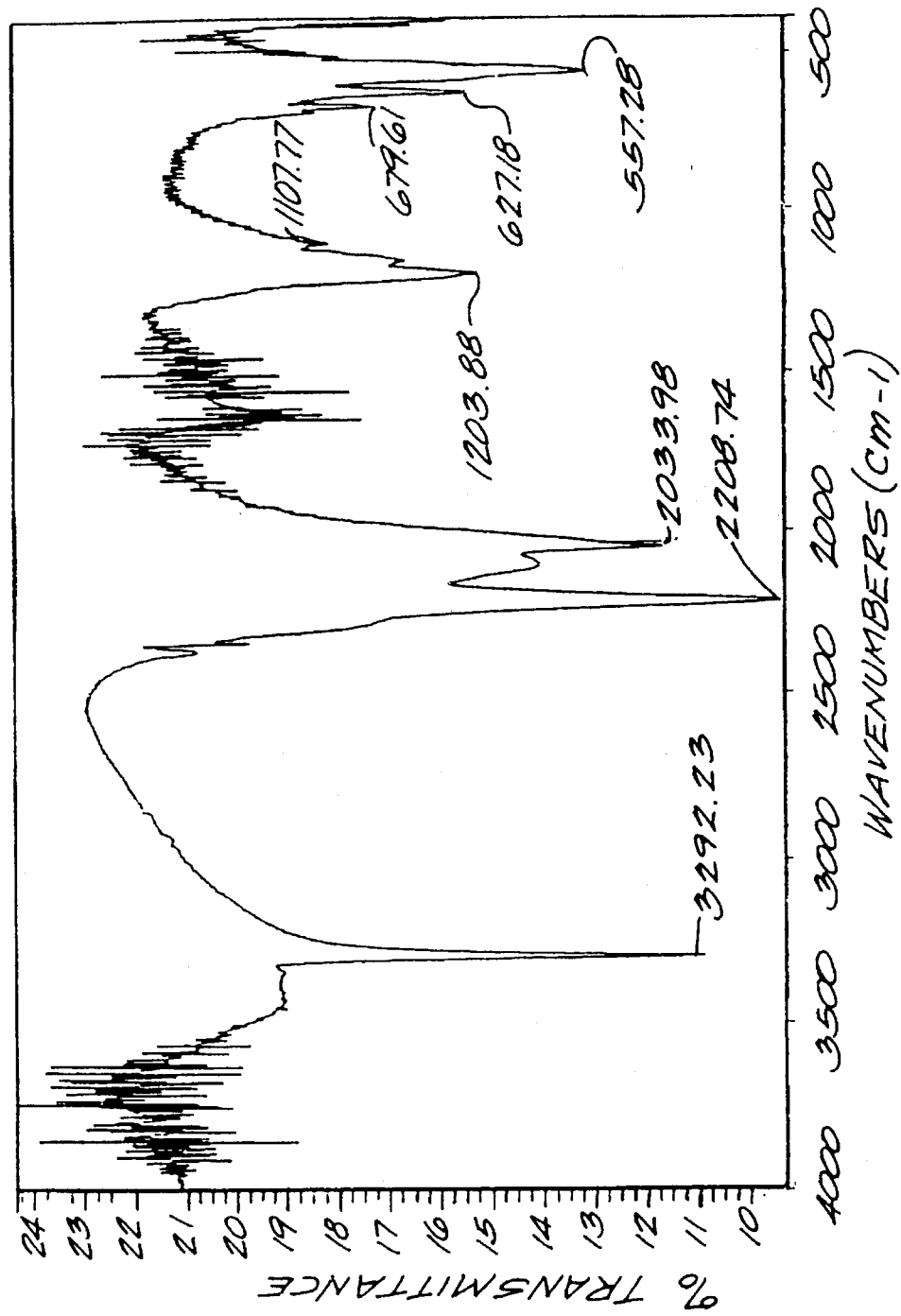

With respect to the IR spectra presented in FIGS. 1 and 2, the narrow, intense band at 3292 cm$^{-1}$ is noted, which constitutes a characteristic feature, assignable perhaps to the N—H bond of the —N(H)CN or hydrogen cyanamide moiety. The presence of a relatively intense triplet band at 1100–1200 and 560–620 cm$^{-1}$, appear to be also characteristic to the bis-hydrogen-cyanamide structure.

The triplet band situated roughly at 2000–2300 cm$^{-1}$ region is known to be typical for metal derivatives of cyanamide. As above stated and noticeable on FIG. 2, its exact position and the component bands' relative intensity are dependent on the pertinent cations' chemical identity. The IR spectrum presented on FIG. 2 relates to the coprecipitated physical mixture (similar to Example 7), characterized by the phase composition formula of $[ZnNCN/(yCo+zNi)(HNCN)_2].(H_2O)_x$, where $y=z$, and $x=0$ to 1. It displays absorption bands characteristic of both distinct solid phase components and it can be regarded as a composite resulted by superposition of ZnNCN's IR spectrum (for reference see FIG. 1 of U.S. Pat. No. 5,176,894) and the appropriate one presented in FIG. 1. Notable are the absorption bands situated at approximately 679 cm$^{-1}$ and 2033 cm$^{-1}$ are characteristic to ZnNCN.

EXAMPLE 1

In order to exemplify the aforementioned inherent limitations of the manufacturing procedures known by the prior

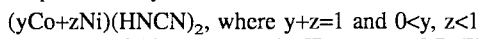

art, $Ni(HNCN)_2.(H_2O)_x$, where x=0–1 was produced following basically the recommendations disclosed in Example 4 of the above-identified Japanese Patent, with some exceptions, as follows:

adequate $Ni^{2+}/H_2NCN=1:2,2$ molar ratio was applied, correspondent to the bis-hydrogen cyanamide structure of the final product concentrated aqueous $NH_3$ solution was employed as pH control reagent all three reagent solutions involved were simultaneously introduced into the reactor at appropriate rate and the total volume of the aqueous phase was comparatively reduced to practical values The process was carried out in 30 minutes by simultaneously introducing Solutions (A), (B) and (C) containing the appropriate amounts of raw materials [(A) –394.1 g. or 1.5 moles of $NiSO_4.6H_2O$ in 900 ml.; (B) –138.6 g. or 3.3 moles of $H_2NCN$ in 500 ml.; (C) –57.0 g. or 3.3 moles of $NH_3$ in 500 ml.] into intensively stirred $H_2O$ at 25°–30° C.

A temporary stoichiometrical excess of $H_2NCN$ was initially generated and kept during the precipitation process, by introducing "ab initio" 10% of Solution (B) into the reactor. Subsequently, all during the precipitation process, Solutions (A) and (B) were introduced at identical rates; however, the delivery rate of (C), the ammonia solution, was adjusted as required to keep the reaction medium's pH=7.5 to 8.5 as recommended by the aforementioned Japanese patent.

The precipitation process was completed by fixing the reaction system's pH=8.5 and stirring for an additional 30 minutes. Subsequently, the vivid green precipitate obtained was filtered, washed to salt-free conditions and dried at 70° C. for 12 hours. The experimental results are presented in Table 1.

TABLE 1

| Measured Parameters | Found Values |
|---|---|
| Product's appearance | Vivid green powder |
| Yield | 191.5 g.; 80.5% |
| Ni as Ni % | 40.0 |
| N as N % | 33.3 |
| $Ni (HNCN)_2$ % | 83.7 calculated, based on N % |
| $H_2O$ % | 9.8 calculated |
| Non-soluble impurities, possible NiO % | 6.5 calculated |
| N/Ni ratio | 3.49 |
| Recovered Process Water: | |
| Volume | 2320 ml. |
| $Ni^{2+}$ Concentration | 5.78 g./l. |
| Total $Ni^{2+}$ Content | 13.4 g. |
| Recovered wash water: | |
| Volume | 6500 ml. |
| Total $Ni^{2+}$ Content | 2.67 g. |
| Total amount of $Ni^{2+}$ lost in process water and wash water | 16.07 g. |
| Calculated amount of lost $Ni(HNCN)_2$: | 43.44 g.; (18.2%) |

It is remarkable that 18% of the final product is not recoverable, being dissolved in the process water, even at optimal $Ni/H_2NCN=1:2.2$ molar ratio. As above indicated, the low yield and related consequences are due to the fact that the precipitation reaction involving soluble hexamine nickelate or cobaltate species respectively is based on the employment of ammonia as the pH control reagent.

The practical embodiment of the present invention is illustrated in 6 examples as follows:

EXAMPLE 2

Pigment grade cobalt bis-hydrogen cyanamide with enhanced corrosion preventive activity symbolized by the structural formula $Co(HNCN)_2.(H_2O)_x$ (where x=0–1) was produced according to the following procedure:

A cobalt salt solution (A) was prepared by solubilizing 1 mole (263.06 g.) technical grade $CoSO_4.6H_2O$ (from Hydrite Chemical Co. of Wisconsin) in 700 ml. water by stirring it at ambient temperature. Water was added to adjust the volume of the $Co^{2+}$ solution to 800 ml.

Solution (B) containing 2.2 moles of hydrogen cyanamide was prepared by introducing 185.0 g. of stabilized aqueous hydrogen cyanamide solution of 50% by weight concentration (available from Cyanamide Canada Inc. under the trade name of Cyanamide-50) into 100 ml. water of normal temperature and by adjusting the solution's final volume to 500 ml.

A sodium hydroxide solution (C) of approximately 10% concentration containing 2 moles of NaOH was prepared by introducing 160 g. technical grade caustic solution of 50% by weight into 400 ml. cold water, cooling it subsequently to ambient temperature and by adjusting the volume to 800 ml.

In order to prepare pigment grade cobalt bis-hydrogen cyanamide, the previously prepared (A), (B) and (C) solutions were introduced simultaneously in approximately 30 minutes (applies to A and C), at identical volumetric rate of approximately 25–30 ml/minute into 400 ml. intensively stirred water at normal temperature.

Substantial stoichiometrical excess of hydrogen cyanamide was assured in the reaction system by carefully keeping the reactant solutions' delivery rate constant all during the precipitation as well as by providing some initial excess of that reagent.

The slurry's pH was monitored accurately and kept rigorously between pH=8.0–9.0 and preferably at pH=8.5 by adjusting the NaOH (C) solution's delivery rate accordingly.

The precipitation was completed by stirring the slurry unheated for one hour at pH=8.5 and the process was completed by heating and stirring the slurry at 40° C.±5° C. for 30 minutes.

Subsequently, the product was washed to an essentially soluble salt-free condition by repeated sedimentation of the slurry, decantation, fresh water introduction and reslurrying until a conductivity of 300 micromhos/cm of the supernatant was reached; at that stage by Cyanamide-50 addition, a concentration of 0.1% hydrogen cyanamide was generated and the slurry was subsequently stirred for 15–30 minutes.

After solid-liquid separation, the pigment grade cobalt bis-hydrogen cyanamide was obtained by drying it at 55°–65° C. for 12 hours to 4–8% $H_2O$ content and pulverizing it to fineness of 100% +230 mesh.

It is important to note that the mother liquor resulting from the first decantation of the slurry, as well as the wash water generated, was colorless and contained only 0.5–1 mg/l dissolved $Co^{2+}$.

Total amount of pigment grade product recovered was 154 g.

Analytical data obtained on dried product typical for pigment grade cobalt bis-hydrogen cyanamide produced according to the above described procedure are presented in Table 2.

TABLE 2

| Analyzed or Tested Value Parameter | Test Procedure | |
|---|---|---|
| | Found | Applied |
| Appearance | Light brown powder | |
| Co as Co % | 40.0 | Complexometry |
| N as N % | 37.2 | Kjeldahl |
| Co bis-hydrogen cyanamide % | 93.6 | Calculated value based on N % |
| $H_2O$ % | 5.2 | Calculated |
| N/Co ratio | 3.91 | |
| Non-soluble impurities probable $Co_2O_3$ % | 1.2 | Calculated |
| Conductivity (micromhos/cm) | 200 ± 25 | ASTM D-281-31 |
| pH | 9.0–9.2 | ASTM D-1208-84/6.1.1 |
| Specific Gravity | 2.23 | ASTM D-113-84 |
| Oil Absorption Lbs/100 Lbs | 27–30 | ASTM D-281-31 |
| Yield | 154.0 g.; 96.9% as monohydrate | |
| Total amount of process water (mother liquor & wash water) recovered l. | Approx. 10 | |
| $Co^{2+}$ concentration in process water mg/l. | <1 | |

EXAMPLE 3

Pigment grade nickel bis-hydrogen cyanamide (symbolized by the structural formula $Ni(HNCN)_2 \cdot (H_2O)_x$ (where x=0–1) with enhanced corrosion preventive activity suitable to be employed in "mirror backing" paint formulations was produced according to the procedure pursuant to Example 2, except that Solution (A) was prepared by dissolving 1 mole (262.7) of technical grade $NiSO_4 \cdot 6H_2O$ in a similar fashion, as presented in Example 2.

Total amount of pigment grade product recovered was 155.0 g.

It is observed that the mother liquor recovered from the first decantation of the slurry, as well as the wash water generated, was colorless and contained 0.5–1 mg/l $Ni^{2+}$.

Analytical data (obtained on dried product) typical for the pigment grade nickel bis-hydrogen cyanamide produced according to the procedure above described are presented in Table 3.

TABLE 3

| Analyzed or Tested Procedure Parameter | Value Found | Test Applied |
|---|---|---|
| Appearance | Light green powder | |
| Ni as Ni % | 38.4 | Complexometry |
| N as N % | 36.3 | Kjeldahl |
| Ni bis-hydrogen cyanamide % | 91.2 | Calculated value based on N % |
| $H_2O$ % | 8.3 | Calculated |
| N/Ni ratio | 3.96 | |
| Non-soluble impurities probable NiO % Calculated | ~0.5 | |
| Conductivity (micromhos/cm) | 200 ± 25 | ASTM D-281-31 |
| pH | 9.0–9.3 | ASTM D-1208-84/6.1.1 |

TABLE 3-continued

| Analyzed or Tested Procedure Parameter | Value Found | Test Applied |
|---|---|---|
| Specific Gravity | 2.22 | ASTM D-113-84 |
| Oil Absorption Lbs/100 Lbs | 27–30 | ASTM D-281-31 |
| Yield | 155.0 g.; 97.6% as monohydrate | |
| Total amount of process water recovered l. | 9–10 | |
| $Ni^{2+}$ concentration in process water $Ni^{2+}$/l. | <1 mg | |

EXAMPLE 4

Coprecipitated pigment grade Co—Ni bis-hydrogen cyanamide solid solution of $(yCo+zNi)(HNCN)_2 \cdot (H_2O)_x$, where y=z and x=0 to 1, characterized by enhanced corrosion preventive activity, suitable to be employed in mirror backing paint system formulations, was produced according to the procedure pursuant to Example 2, except that Solution (A) was prepared by dissolving 0.5 mole of each $CoSO_4 \cdot 6H_2O$ (131.45 g.) and $NiSO_4 \cdot 6H_2O$ (131.35 g.) in a similar fashion, as presented in Example 2.

Total amount of pigment grade solid solution recovered (before grinding) was 152.0 g.

It is observed that the mother liquor recovered from the first decantation of the slurry was, as well as the wash water generated, colorless and contained 0.5–1 mg/l. $Co^{2+}$ and $Ni^{2+}$.

Typical analytical data (obtained on dried product) characterizing the pigment grade solid solution obtained according to the above-presented procedure, are presented in Table 4.

TABLE 4

| Analyzed or Tested Procedure Parameter | Value Found | Test Applied |
|---|---|---|
| Appearance | Light brown powder | |
| (Ni & Co) % | 38.6 | Complexometry |
| N as N % | 36.7 | Kjeldahl |
| (Co + Ni) bis-hydrogen cyanamide % | 92.3 | Calculated value based on N % |
| $H_2O$ % | 7.6 | Calculated |
| N/(Co + Ni) ratio | 3.99 | |
| Non-soluble impurities (probable NiO + $Co_2O_3$) % Calculated | <0.2 | |
| Conductivity (micromhos/cm) | 200 ± 50 | ASTM D-281-31 |
| pH | 8.6–8.9 | ASTM D-1208-84/6.1.1 |
| Specific Gravity | 2.23 | ASTM D-113-84 |
| Oil Absorption, Lbs/100 Lbs. | 27–30 | ASTM D-281-31 |
| Yield | 152.0 g.; 95.7% as monohydrate | |
| Total amount of process water recovered l. | 10–11 | |
| $Ni^{2+}$ + $Co^{2+}$ concentration in process water mg/l. | <1 | |

EXAMPLE 5

A coprecipitated physical mixture of $Ni^{2+}$ bis-hydrogen cyanamide/zinc cyanamide pigment system with 1:10 molar ratio, characterized by a phase composition of $[ZnNCN/0.1.Ni(HNCN)_2].(H_2O)_x$, where $x=0-1$, and enhanced corrosion preventive activity on silver substrate and applicable in mirror backing formulations was produced according to the procedure, as follows:

A combination (A) of a soluble nickel salt solution-zinc oxide suspension was prepared by introducing 0.1 moles of $NiSO_4.6H_2O$ (26.3 g.) as 30% aqueous solution, into a previously prepared ZnO suspension of 10–12%, containing 1.0 mole (81.4 g.) of well dispersed and hydrated high grade ZnO at normal temperature and by adjusting the total volume to 600 ml.

The above-mentioned ZnO suspension was obtained by introducing, in small increments, 81.4. of finely ground ZnO (Azo 66 grade, with average particle size of 0.25 microns and 99.8% assay, manufactured by Asarco, Inc. was used) into 400 ml. intensively stirred hot water at 75°–80° C. and by cooling it to ambient temperature after one hour.

Solution (B) containing 1.32 moles of hydrogen cyanamide was prepared by introducing 110.9 g. Cyanamide-50 into 250 ml. water and by completing the solution's volume to 400 ml.

A sodium hydroxide solution (C) of approximately 16% concentration, containing 10.2 moles of NaOH was prepared by introducing 16.0 g. technical grade caustic solution of 50% by weight into 50 ml. cold water, cooling it subsequently to normal temperature and by completing the volume to 100 ml.

Coprecipitated physical mixture of $Ni^{2+}$ bis-hydrogen cyanamide/zinc cyanamide at 1:10 molar ratio was produced by simultaneous introduction, at identical delivery rate, of solutions (A) and (B) into 200 ml. intensively stirred water, at normal temperature, respectively by adjusting the delivery rate of solution (C) accordingly to keep the reaction system's pH=8–9.0, and preferably at pH=8.5, all during the reaction.

By keeping the delivery rate of Solution (A) and (B) rigorously identical, substantial stoichiometrical excess of $H_2NCN$ was kept in the reaction system all during precipitation.

The reaction was completed by stirring for two hours and adjusting the slurry's pH periodically to pH=8.5 by diluted $H_2SO_4$ addition, and by heating it at 40° C.±3° C. for 30 minutes. Subsequently, the resultant coprecipitated product was processed in a similar fashion as presented at Example 2.

The total amount of pigment grade coprecipitated product recovered was 120.5 g. The resultant mother liquor and wash water (total amount of 6.01) was colorless and contained less than 0.5 mg. $Ni^{2+}/l$. Analytical data relevant to such coprecipitated physical mixture are presented in Table 5.

TABLE 5

| Analyzed or Tested Parameter | Found Values |
|---|---|
| Appearance | White-faint green powder |
| Zn as Zn % | 52.82 |
| Ni as Ni % | 4.95 |
| N as N % | 23.94 |
| $ZnNCN/0.1 Ni (HNCN)_2$ % | 71.2 - Calculated |

TABLE 5-continued

| Analyzed or Tested Parameter | Found Values |
|---|---|
| Oxides (ZnO, NiO) % | 21.6 - Calculated |
| $H_2O$ % | 7.2 - Calculated |
| Zn/Ni ratio | 9.58 |
| N/(Zn + Ni) ratio | 1.91 |
| Conductivity (micromhos/cm) | 350–600 |
| pH | 8.0–8.5 |
| Specific Gravity | 2.80 |

EXAMPLE 6

A physical mixture of $Co^{2+}$ bis-hydrogen cyanamide/zinc cyanamide coprecipitated pigment system with 1:10 molar ratio characterized by a phase composition of
$[ZnNCN/0.1.Co(HNCN)_2].(H_2O)_x$, where $x=0-1$, applicable in mirror backing formulations, was produced in an identical manner as presented in Example 5, except that instead of $NiSO_4.6H_2O$, Solution (A) contained 0.1 moles (26.3 g.) of technical grade $CoSO_4.6H_2O$.

The resultant process water was colorless and contained less than 0.5 mg. $Co^{2+}/l$. A total amount of 120.0 g. of coprecipitated product was recovered. The relevant analytical data are presented in Table 6.

TABLE 6

| Analyzed or Tested Parameter | Found Values |
|---|---|
| Appearance | Light brown powder |
| Zn as Zn % | 52.95 |
| Co as Co % | 4.86 |
| N as N % | 24.21 |
| $ZnNCN + 0.1 Co(HNCN)_2$ | 72.0 - Calculated |
| $H_2O$ % | 6.4 - Calculated |
| Oxides (ZnO, $Co_2O_3$) % | 21.6 - Calculated |
| Zn/Co ratio | 9.82 |
| N/(Zn + Co) ratio | 1.93 |
| Conductivity (micromhos/cm) | 350–600 |
| pH | 8.0–8.6 |
| Specific Gravity | 2.78 |

EXAMPLE 7

Pigment grade coprecipitated physical mixture containing a solid solution of (Co+Ni)-bishydrogen cyanamide and ZnNCN in 1:10 molar ratio, characterized by a phase composition formula of $[ZnNCN/0.1(yCo+zNi)(HNCN)_2].(H_2O)_x$, where $y=Z$ and $x=0$ to 1, suitable for mirror backing formulations, was prepared in identical manner as presented in Example 5, except that (A) contained 0.05 moles (13.1 g.) each of $NiSO_4.6H_2O$ and $CoSO_4.6H_2O$.

A total amount of 120.5 g. of coprecipitated product was recovered. The resulted process water was colorless and contained less than 0.5 mg./l. of $Ni^{2+}$ and $Co^{2+}$ species. The relevant analytical data are presented in Table 7.

TABLE 7

| Analyzed or Tested Parameter | Found Values |
|---|---|
| Appearance | Light brown powder |

TABLE 7-continued

| Analyzed or Tested Parameter | Found Values |
| --- | --- |
| Zn as Zn % | 52.87 |
| Ni and Co % | 4.91 |
| N as N % | 24.20 |
| ZnNCN + 0.1(Co + Ni)(HNCN)$_2$ | 72.0 - Calculated |
| Zn/(Co + Ni) ratio | 9.68 |
| N/(Zn + Co + Ni) ratio | 1.93 |
| H$_2$O % | 7.2 |
| Oxides (ZnO, Co$_2$O$_3$, NiO) % | 20.8 |
| Conductivity (micromhos/cm) | 350–600 |
| pH | 8.0–8.6 |
| Specific Gravity | 2.79 |

The corrosion retardant materials of this invention can be incorporated into a mirror backing composition containing an organic film forming resin which is dispersed or dissolved in either water or an organic solvent. The organic film forming resin should be one which is compatible with the thin metallic mirror film and does not promote deterioration and discoloration of the film. Thus, the resin should not contain functional groups which are reactive with the metal. Preferred organic film forming resins include alkyd resins, acrylic resins, acrylic modified alkyd resins, polyurethane oils, vinyl halide polymers or copolymers, epoxy melamine or urea resins, non-oil based urethane, phenolformaldehyde resins curable by air drying or baking, or any other resin which is compatible to the metallic layers formed on mirror backings. Examples of solvents for such compositions include xylene, MIBK or toluene. The composition can also contain other components such as catalysts, flow control agents, dryers, anti-settling agents, and the like and mixtures thereof.

What is claimed is:

1. A corrosion inhibitor pigment composition comprising a solid solution of (Ni$^{2+}$ and Co$^{2+}$)-bis-hydrogen cyanamide.

2. A corrosion inhibitor pigment composition according to claim 1 wherein said (Ni$^{2+}$ and Co$^{2+}$)-bis-hydrogen cyanamide is coprecipitated with zinc cyanamide.

3. A corrosion inhibitor pigment composition according to claim 1 wherein said solid solution is coprecipitated with a transition metal cyanamide selected from the group consisting of Pb$^{2+}$, Cd$^{2+}$, Cu$^{2+}$, Ag$^+$ and Zn$^{2+}$.

4. A composition according to claim 1 wherein said solid solution comprises approximately equal molar parts of cobalt and nickel.

5. A mirror back coating composition for long term prevention of corrosion of silver coated thereon comprising an organic resin polymer coating material carried in an aqueous or non-aqueous medium; and, a corrosion inhibiting amount of a solid solution of (Ni$^{2+}$ and Co$^{2+}$)-bis-hydrogen cyanamide interspersed in said medium.

* * * * *